United States Patent Office 3,428,661
Patented Feb. 18, 1969

3,428,661
IRIDIUM (I) COMPOUNDS WITH CHELATING LIGANDS
Keith Andrew Taylor, Runcorn, England, assignor to Imperial Chemical Industries Limited, Millbank, London, England, a corporation of Great Britain
No Drawing. Filed Apr. 21, 1966, Ser. No. 545,522
Claims priority, application Great Britain, Apr. 30, 1965, 18,327/65
U.S. Cl. 260—429      13 Claims
Int. Cl. C07f *3/10, 9/66;* C07c *5/02*

ABSTRACT OF THE DISCLOSURE

There are provided complex compounds of iridium (I) and a process for the preparation thereof. The compounds have the general formula $$Z_xIr(R_n.X\!-\!R'\!-\!X'.R_n)(R_n.X''\!-\!R'\!-\!X'''.R_n)Y$$

where:

Z represents nothing ($x=0$) or a neutral ligand ($x=1$);
X, X', X'' and X''' represent an element or elements of groups 5b or 6b of the Periodic Table of the elements and where the various elements X may be the same or different;
R represents an organic group or hydrogen. For simple groups $n$ is 1 or 2 as required to satisfy the relative valencies of R and the various elements X but more complex groups may form part of ring systems including the elements X, X', X'', X''' and possibly parts of the groups R';
R' represents an organic group having a valency of at least 2 and a chain of $z$ carbon atoms (where $z=1\!-\!4$) linking the elements X, X', X'', X''' where some but not all of the carbon atoms may be replaced by oxygen, sulphur or phosphorus and Y represents a monovalent anion.

---

This invention relates to complex compounds of iridium, the preparation of these compounds and to their use as hydrogenation catalysts.

Complex compounds of iridium with mono-dentate phosphine ligands are known. I have discovered certain novel complex compounds of iridium with bi-dentate phosphine ligands and that certain of these compounds are of use as hydrogenation catalysts.

Accordingly the present invention provides compounds of general formula $$Z_xIr(R_n.X\!-\!R'\!-\!X'.R_n)(R_n.X''\!-\!R'\!-\!X'''.R_n)Y \quad (1)$$

where:

Z represents nothing ($x=0$) or a neutral ligand ($x=1$) or an anionic ligand ($x=2$ for a monovalent anion or 1 for a divalent anion);
X, X', X'' and X''' represent an element or elements of Groups 5b or 6b of the Periodic Table of the elements where the various elements X may be the same or different;
R represents an organic group or hydrogen and where each R may be the same or different. For simple groups $n$ is 1 or 2 as required to satisfy the relative valencies of R and the various elements X but more complex groups may form part of ring systems including the elements X, X', X'', X''' and possibly parts of the groups R';
R' represents an organic group having a valency of at least 2 and a chain of $z$ carbon atoms (where $z=1\!-\!4$) linking the elements X, X', X'', X''' where some but not all of the carbon atoms may be replaced by oxygen, sulphur or phosphorus; and
Y represents a monovalent anion.

When Z is anionic it is preferably monovalent (e.g. hydrogen).

In some cases (for example when Z represents CO) the two compounds represented by the presence or absence of Z may exist in equilibrium representing two co-ordination states of iridium, with Z being taken up or released by the complex according to conditions.

Preferably the ligands ($R_nX\!-\!R'\!-\!X'R_n$) and $$(R_nX''\!-\!R'\!-\!X'''R_n)$$

are the same.

X, X' X'' and X''' are preferably phosphorus, arsenic or sulphur and may be the same or different. R and R' may be selected from a wide range of organic groups but are preferably hydrocarbon groups or substituted derivatives thereof especially aliphatic and aryl hydrocarbon radicals or substituted derivatives including alicyclic, aralyl, alkaryl, alkoxy, aryloxy. R' preferably comprises a chain of $z$ carbon atoms (e.g. —$CH_2$—$CH_2$—) but oxygen, sulphur or phosphorus may be present in the chain. The numerical value of $z$ is preferably 1 to 3. The nature of the anion Y is not critical but complexes where Y is a halide ion are convenient to make.

According to another aspect of the present invention a process for the preparation of the compound provided by the present invention and represented by Formula 1 above comprises reacting bi-dentate ligands of general formula $R_n.X.R'.X'.R_n$ and $R_nX''\!-\!R'\!-\!X'''R_n$ where the symbols have the meanings ascribed to them above; with an iridium complex of general formula $$IrL_yL'$$

where:

L represents a neutral ligand, $y$ equals 3 or 4 and the various ligands L may be the same or different;
L' represents an anionic ligand; and where at least one of the elements X, X', X'' or X''' from each of the ligands ($R_nX\!-\!R'\!-\!X'R_n$) and $$(R_nX''\!-\!R'\!-\!X'''R_n)$$

is capable of displacing at least two of the ligands L.

Preferably only one ligand ($R_nX\!-\!R'\!-\!X'R_n$) is used and two molecules of this ligand then appear in each molecule of the product.

Conveniently a trans pair of the ligands L are organic substituted phosphines. One of the ligands is conveniently carbon monoxide and the anionic ligand L' may conveniently be a halide ion for example.

The process should where necessary be performed in an inert atmosphere for example nitrogen. In some cases the reaction will normally proceed by the ligands L being displaced by the bi-dentate ligand to form a compound of general formula $$(R_nX''\!-\!R'\!-\!X'''R_n)Ir(R_n.X.R'.X'.R_n)L'$$

where L' is a special case of Y in Formula 1 above. L' can however be replaced by other anions to give the generalised Formula 1.

One of the neutral ligands L may remain co-ordinated with the complex to form a special case of Z in Formula 1 but none of the ligands L need be present in the final complex since they may all be replaced by other ligands to give the generalised Formula 1.

In general the reaction is conveniently carried out in the liquid phase and temperature is not critical, but high temperatures tend to favour the formation of complexes where Z in Formula 1 is not present. A range of solvents can be used but in general more polar solvents increase the speed of reaction and lead to the absence of Z in Formula 1.

According to a further aspect of the present invention we provide a process for the hydrogenation of olefinically or acetylenically unsaturated compounds in which a compound as provided by the present invention and represented by Formula 1 above is used as a catalyst.

The catalyst is conveniently used in the liquid phase and in solution. The reaction is conveniently carried out at elevated pressure and temperature. The catalyst may be prepared in situ by adding the appropriate starting materials to the reaction mixture. Mixtures of catalysts may be used. Some chemical change may occur in the catalyst during the reaction (e.g. the uptake of hydrogen).

The olefinically or acetylenically unsaturated compounds may be hydrocarbons but wide substitution is possible provided that the substituents do not interfere with the hydrogenation reaction.

Examples of the invention will now be described.

EXAMPLE 1

IrCl(CO)(PPH$_3$)$_2$ (2.0 g.; 2.6 milli-moles) was dissolved in 550 mls. of benzene. The solution was refluxed in an atmosphere of nitrogen and a solution of Ph$_2$PCH$_2$CH$_2$PPh$_2$ (6.22 g.; 15.5 milli-moles) was added slowly over 50 mins. After two days under reflux the orange crystals which had separated out were filtered, washed with benzene and dried to yield 2.7 g. of an orange solid with melting point of 229°. Elemental analysis was consistent with the formulation Ir(Ph$_2$PCH$_2$CH$_2$PPh$_2$)$_2$Cl.2H$_2$O.

EXAMPLE 2

IrCl(CO)(PPh$_3$)$_2$ (1.86 g.; 2.4 milli-moles) was dissolved in a minimum of tetrahydrofuran. A solution of Ph$_2$PCH$_2$CH$_2$PPh$_2$ (2.85 g.; 7.1 milli-moles) in 75 mls. of tetrahydrofuran was added and the mixture was kept at room temperature for several days in an atmosphere of CO. 2.34 g. of yellow crystals, melting point 205° C., were filtered off. Elemental analysis was consistent with the formulation CO.Ir(Ph$_2$PCH$_2$CH$_2$PPh$_2$)$_2$Cl.

EXAMPLE 3

IrBr(CO)(PPh$_3$)$_2$ (0.2 g.) and Ph$_2$PCH$_2$PPh$_2$ (0.2 g.) were dissolved separately in tetrahydrofuran. The solutions were mixed under a CO atmosphere and left to stand for several days. 0.21 g. of yellow crystalline Ir(Ph$_2$PCH$_2$PPh$_2$)$_2$(CO)Br (M.P. 210–215° C.) was filtered, washed and dried.

EXAMPLE 4

IrBr(CO)(PPh$_2$Et)$_2$ (0.2 g.) was dissolved in ethanol. Ph$_2$PCH$_2$CH$_2$.SPh (0.25 g.) dissolved in ethanol, was added and the mixture refluxed in a nitrogen atmosphere for two days. The majority of the ethanol was removed under low pressure. Petroleum ether was added to the concentrated solution when 0.31 g. of yellow Ir(Ph$_2$PCH$_2$CH$_2$SPh)$_2$Br was precipitated and collected M.P. 150–157° C.

EXAMPLE 5

The perchlorate and tetraphenylboron complexes corresponding to the halide complexes of Examples 1–4 were prepared by treatment of the halides with sodium perchlorate and sodium tetraphenylboron.

EXAMPLE 6

Pent-1-ene (10 g.; 143 milli-moles), hex-3-yne (10 g.; 122 milli-moles) and benzene (10 g.; 128 milli-moles) were charged into a stainless steel autoclave.

Ir(Ph$_2$PCH$_2$CH$_2$PPh$_2$)$_2$Cl (10.2 mg.; .013 milli-mole) dissolved in a small amount of chloroform was added. The autoclave was pressurised to 610 p.s.i. with hydrogen gas. The temperature was raised to 175° C. and held there for one hour when the vessel was rapidly cooled. The excess hydrogen was vented off, the products collected. Analysis by gas liquid chromatography showed that the composition of the product was 57 milli-moles pentane, 76 mill-moles pentenes, 21 milli-moles hexane, 70 milli-moles hexenes, 22 milli-moles hexynes.

EXAMPLE 7

Oct-1-ene (10 g.; 89 milli-moles) and benzene (75 g.; 960 milli-moles) were charged into a stainless steel autoclave. Ir(Ph$_2$PCH$_2$CH$_2$PPh$_2$)$_2$Cl (10.2 mg.; .013 milli-mole) was washed in with a little benzene. The vessel was pressurised with hydrogen to a pressure of 600 p.s.i. at room temperature. The temperature was raised to 170° and held for one hour followed by rapid cooling to room temperature. The products were collected after venting off excess hydrogen and shown by analysis to contain 8.0 milli-moles of octane.

EXAMPLE 8

Allyl chloride (30 g.) and benzene (60 g.) were charged into an Inconel autoclave.

Ir(Ph$_2$PCH$_2$CH$_2$PPh$_2$)$_2$Cl (50 mg.) was dissolved in chloroform (2 ml.) and added. The vessel was pressurised with hydrogen and heated so that working conditions of 175° C. and 1400 p.s.i. were obtained. The system was held like this for 24 hours, during which time there was a pressure drop of 430 p.s.i. The vessel was allowed to cool and the gaseous phase vented into an aspirator tto give 8 litres of gas containing 0.3 g. propane. The liquid phase was analysed and contained 0.6 g. propane, 6.6 g. of 2-chloropropane, 19.6 g. of 1-chloropropane and 0.5 g. of unused allyl chloride. There was also some HCl present in the liquid phase.

EXAMPLE 9

10 mls. of a solution containing hex-1-yne (10% by weight, oct-1-ene (10%) and benzene were placed in a glass vessel together with Ir(Ph$_2$PCH$_2$CH$_2$PPh$_2$)$_2$Cl (1 mg.) dissolved in 0.2 ml. of chloroform. The glass vessel was placed inside an autoclave. The system was pressurised to 1200 p.s.i. at 20° C. with H$_2$ and then heated to 175° C. It was then rocked for 1 hour and then cooled rapidly. Excess of hydrogen was vented off and the liquid product collected and analysed. The benzene solution contained 1.3% hexane, 2.9% hexenes, 3.8% hex-1-yne, 1.6% octane and 6.3% octenes.

EXAMPLE 10

The procedure was as in Example 9, with the difference that 1 mg. of Ir(CO)(Ph$_2$PCH$_2$PPh$_2$)$_2$Cl was used as catalyst and a temperature of 150° was maintained. The liquid phase contained 2.2% hexane, 2.9% hexenes, 2.4% hex-1-yne, 2.7% octane and 4.8% octenes.

EXAMPLE 11

The procedure was as in Example 9 but

Ir(Ph$_2$PCH$_2$CH$_2$SPh)$_2$Br (0.5 mg.) dissolved in 0.2 ml. benzene was used as catalyst. The liquid phase contained 0.2% hexane, 4.1% hexenes, 6.4% hex-1-yne, 0.5% octane and 8.9% octenes.

EXAMPLE 12

0.5 g. of Ir(Ph$_2$PCH$_2$CH$_2$PPh$_2$)$_2$Cl was dissolved in 30 mls. of chloroform. Hydrogen gas was passed into this solution for 3 hours. The solvent was then removed and the solid remaining was recrystallised from a tetrahydrofuran/petrol mixture to give 0.26 g. of IrH$_2$(Ph$_2$PCH$_2$CH$_2$PPh$_2$)$_2$Cl (M.P. 185–192°).

EXAMPLE 13

0.5 g. of IrCl(CO)(AsPh$_3$)$_2$ was dissolved in 30 mls. of tetrahydrofuran. 0.55 g. of Ph₂AsCH₂AsPh₂ in a little tetrahydrofuran was added and the solution became red in colour. The volume of the solution was reduced to 5 mls. and petroleum ether was added to precipitate 0.36 g. of an orange solid Ir(Ph₂AsCH₂AsPh₂)₂Cl (M.P. 208).

I claim:

1. A complex compound of monovalent iridium of general formula $$Z_xIr(R_n \cdot X-R'-X' \cdot R_n)(R_n \cdot X''-R'-X''' \cdot R_n)Y$$

where:

Z represents nothing ($x=0$) or a neutral ligand ($x=1$);

X, X', X" and X'" represent an element or elements of Groups 5b or 6b of the Periodic Table of the elements and where the various elements X may be the same or different;

R represents an organic group or hydrogen and where each R may be the same or different; and where $n$ can be 1 or 2 as required to satisfy the relative valencies of R and the various elements X but can also be more complex groups forming part of ring systems including the elements X, X', X", X'" and parts of the groups R';

R' represents an organic group having a valency of at least 2 and a chain of $z$ carbon atoms (where $z=1$–4) linking the elements X, X', X", X'" where some but not all of the carbon atoms may be replaced by oxygen, sulphur or phosphorus; and Y represents a monovalent anion.

2. A compound as claimed in claim 1 in which the ligands ($R_nX-R'-X'-R_n$) and ($R_nX''-R'-X'''R_n$) are the same.

3. A compound as claimed in claim 2 in which the elements X, X', X", X'" are the same.

4. A compound as claimed in claim 1 in which X, X', X", X'" are phosphorus, arsenic or sulphur.

5. A compound as claimed in claim 4 in which X, X', X", X'" are all phosphorus.

6. A compound as claimed in claim 1 in which R' is a divalent radical of general formula —(CH₂)$_z$— where $z$ is 1, 2, 3 or 4.

7. A compound as claimed in claim 6 in which $z$ is 1, 2 or 3.

8. A compound as claimed claim 1 in which R is an unsubstituted aryl or alkyl group.

9. A compound as claimed in claim 1 in which Z is CO.

10. A process for the production of a compound as claimed in claim 1 which comprises reacting bi-dentate ligands of general formula $R_n \cdot X \cdot R' \cdot X' \cdot R_n$ and $$(R_nX''-R'-X'''R_n)$$

where the symbols have the meanings ascribed to them in claim 1 with a complex compound of iridium of general formula $$IrL_yL'$$

where:

L represents a neutral ligand;

$y$ equals 3 or 4 and the various ligands L may be the same or different;

L' represents an anionic ligand; and where at least one of the elements X, X', X" or X'" from each of the ligands ($R_nX-R'-X' R_n$) and $$(R_nX''-R'-X'''R_n)$$

is capable of displacing at least two of the ligands L.

11. A process as claimed in claim 10 in which only one ligand ($R_nX-R'-X'R_n$) is used and two molecules of this ligand appear in each molecule of the product.

12. A process as claimed in claim 10 in which a trans pair of the ligands L are organic substituted phosphines.

13. A process as claimed in claim 10 when performed in an inert atmosphere.

References Cited

UNITED STATES PATENTS

| | | | |
|---|---|---|---|
| 3,084,179 | 4/1963 | Chatt et al. | 260—429 |
| 3,133,943 | 5/1964 | Chatt et al. | 260—429 |
| 3,324,018 | 6/1967 | Fotis et al. | 204—162 |

OTHER REFERENCES

Chiswell et al.: J. Chem. Soc. (1960) pp. 3181–4.

Chiswell et al: J. Inorg. Nucl. Chem. 26 (1964), pp. 47–51.

Chatt et al.: J. Chem. Soc. (1964), pp. 1625–31.

TOBIAS E. LEVOW, *Primary Examiner.*

A. P. DEMERS, *Assistant Examiner.*

U.S. Cl. X.R.

252—431; 260—441, 683.9, 690